US012572177B2

(12) United States Patent 
Morino et al.

(10) Patent No.: US 12,572,177 B2 
(45) Date of Patent: Mar. 10, 2026

(54) ELECTRONIC APPARATUS AND DISPLAY ASSEMBLY

(71) Applicant: Lenovo (Singapore) Pte. Ltd., Singapore (SG)

(72) Inventors: Takayuki Morino, Kanagawa (JP); Moriyuki Tsuchihashi, Kanagawa (JP); Yalu Liu, Kanagawa (JP); Daisuke Takahashi, Kanagawa (JP)

(73) Assignee: Lenovo (Singapore) Pte. Ltd., Singapore (SG)

( * ) Notice: Subject to any disclaimer, the term of this patent is extended or adjusted under 35 U.S.C. 154(b) by 104 days.

(21) Appl. No.: 18/737,011

(22) Filed: Jun. 7, 2024

(65) Prior Publication Data

US 2025/0028363 A1 Jan. 23, 2025

(30) Foreign Application Priority Data

Jul. 21, 2023 (JP) ................................. 2023-118866

(51) Int. Cl. 
G06F 1/16 (2006.01)

(52) U.S. Cl. 
CPC .................................. G06F 1/1652 (2013.01)

(58) Field of Classification Search 
CPC combination set(s) only. 
See application file for complete search history.

(56) References Cited

U.S. PATENT DOCUMENTS 10,831,241 B1 * 11/2020 Watamura ............. G06F 1/1652 
11,487,329 B2 * 11/2022 Tsuchihashi .......... G06F 1/1652

11,615,722 B2 * 3/2023 Morino ................ G06F 1/1616 
                                                      345/173 
11,723,170 B2 * 8/2023 Ohyama ............... G06F 1/1681 
                                                      361/679.27 
11,758,672 B2 * 9/2023 Morino ................ G06F 1/1681 
                                                      361/807 
12,287,682 B2 * 4/2025 Miyamoto .......... H04M 1/0216 
12,342,481 B2 * 6/2025 Kim ...................... G06F 1/1681 
12,360,573 B2 * 7/2025 Takahashi ............... G06F 1/203 
2021/0263563 A1 * 8/2021 Tsuchihashi .......... G06F 1/1652 
2022/0232729 A1 * 7/2022 Ohyama ............... G06F 1/1681 
2022/0338362 A1 * 10/2022 Morino ................ G06F 1/1641

(Continued)

FOREIGN PATENT DOCUMENTS

JP        2014-26385 A       2/2014 
JP        2018-81186 A       5/2018

(Continued)

*Primary Examiner* — Lisa Lea-Edmonds

(74) *Attorney, Agent, or Firm* — Osha Bergman Watanabe & Burton LLP

(57) ABSTRACT

An electronic apparatus includes: a first chassis; a second chassis configured to be adjacent to the first chassis and connected to the first chassis to be relatively rotatable between a first posture in which the first chassis and the second chassis are stacked such that surface normal directions of the first chassis and the second chassis overlap each other, and a second posture in which the surface normal directions of the first chassis and the second chassis are disposed side by side each other on left and right sides; and a display assembly configured to be provided over between the first chassis and the second chassis, and be bent according to relative rotations of the first chassis and the second chassis.

9 Claims, 11 Drawing Sheets

(56)  References Cited

U.S. PATENT DOCUMENTS

| | | | | |
|---|---|---|---|---|
| 2022/0343808 A1* | 10/2022 | Morino | ................ | G06F 1/1616 |
| 2023/0266803 A1* | 8/2023 | Takahashi | ............ | G06F 1/1652 |
| | | | | 361/679.27 |
| 2023/0305602 A1* | 9/2023 | Miyamoto | ............ | G06F 1/1616 |
| 2024/0211000 A1* | 6/2024 | Kinoshita | ............. | G06F 1/1616 |
| 2024/0211004 A1* | 6/2024 | Kinoshita | ............ | G06F 1/1681 |
| 2025/0028363 A1* | 1/2025 | Morino | ................ | G06F 1/1652 |

FOREIGN PATENT DOCUMENTS

| | | |
|---|---|---|
| JP | 2021-131812 A | 9/2021 |
| JP | 2022166990 A | 11/2022 |

* cited by examiner

ELECTRONIC APPARATUS AND DISPLAY ASSEMBLY

CROSS-REFERENCE TO RELATED APPLICATIONS

This application claims priority to Japanese Patent Application No. 2023-118866 filed on Jul. 21, 2023, the contents of which are hereby incorporated herein by reference in their entirety.

TECHNICAL FIELD

The present invention relates to an electronic apparatus and a display assembly.

BACKGROUND

In recent years, electronic apparatuses such as PCs and smartphones that have a touch panel type liquid crystal display and do not have a physical keyboard are rapidly spreading. This type of display of the electronic apparatus is desired to be large when in use, but is desired to be small when not in use. Therefore, an electronic apparatus, which is configured such that not only a chassis but also a display is able to be bent by using a paper-like flexible display having flexibility has been proposed (see, for example, Japanese Unexamined Patent Application Publication No. 2022-166990).

Since the display that is bent needs to be able to withstand a repeated bending operation, it is necessary to perform a bending operation at a desired curvature radius in a design. On the other hand, the chassis is required to be as thin as possible. Therefore, as in the configuration of Japanese Unexamined Patent Application Publication No. 2022-166990, an installation structure in which the bending directions are reversed may be adopted for such a display. In this case, if the curvature radius at portions where the bending directions are reversed is too small, there is a concern that a failure such as interlayer-peeling may occur in the display.

SUMMARY

One or more embodiments of the present invention provide an electronic apparatus and a display assembly capable of suppressing occurrence of a failure of a display due to a bending operation.

An electronic apparatus according to one or more embodiments of the present invention includes a first chassis; a second chassis configured to be adjacent to the first chassis and connected to the first chassis to be relatively rotatable between a first posture in which the first chassis and the second chassis are stacked such that surface normal directions of the first chassis and the second chassis overlap each other, and a second posture in which the surface normal directions of the first chassis and the second chassis are disposed side by side each other on left and right sides; and a display assembly configured to be provided over between the first chassis and the second chassis, and be bent according to relative rotations of the first chassis and the second chassis, in which the display assembly includes a first plate configured to have a first end portion and be fixed to the first chassis, a second plate configured to have a second end portion that is provided to face the first end portion with a predetermined gap and be fixed to the second chassis such that the first plate and the second plate are stacked such that surface normal directions of the first plate and the second plate overlap each other during the first posture and the first plate and the second plate are disposed with the surface normal directions of the first plate and the second plate being aligned side by side each other on left and right sides during the second posture, and a flexible display configured to have a first region fixed to a surface of the first plate by using a first adhesive member, a second region fixed to a surface of the second plate by using a second adhesive member, and a bending region disposed to straddle the gap between the first region and the second region, the bending region of the display is formed with an arc-shaped bent portion at a position protruding from the first end portion and the second end portion during the first posture, and the bent portion has an outer diameter that is larger than a stacked height of the first plate and the second plate in a stacking direction of the first plate and the second plate, the first plate has a first non-adhesive portion in which the first region is not fixed without the first adhesive member being provided in a predetermined range from the first end portion on the surface of the first plate, and the second plate has a second non-adhesive portion in which the second region is not fixed without the second adhesive member being provided in a predetermined range from the second end portion on the surface of the second plate.

An electronic apparatus according to one or more embodiments of the present invention includes a first chassis; a second chassis configured to be adjacent to the first chassis and connected to the first chassis to be relatively rotatable between a first posture in which the first chassis and the second chassis are stacked such that surface normal directions of the first chassis and the second chassis overlap each other, and a second posture in which the surface normal directions of the first chassis and the second chassis are disposed side by side each other on left and right sides; and a display assembly configured to be provided over between the first chassis and the second chassis, and be bent according to relative rotations of the first chassis and the second chassis, in which the display assembly includes a first plate configured to have a first end portion and be fixed to the first chassis, a second plate configured to have a second end portion that is provided to face the first end portion with a predetermined gap and be fixed to the second chassis such that the first plate and the second plate are stacked such that surface normal directions of the first plate and the second plate overlap each other during the first posture and the first plate and the second plate are disposed with the surface normal directions of the first plate and the second plate being aligned side by side each other on left and right sides during the second posture, and a flexible display configured to have a first region fixed to a surface of the first plate, a second region fixed to a surface of the second plate, and a bending region disposed to straddle the gap between the first region and the second region, the bending region of the display is formed with an arc-shaped bent portion at a position protruding from the first end portion and the second end portion during the first posture, and the bent portion has an outer diameter that is larger than a stacked height of the first plate and the second plate in a stacking direction of the first plate and the second plate, a gap is provided between the display and the surface of the first plate in a predetermined range from the first end portion, and a gap is provided between the display and the surface of the second plate in a predetermined range from the second end portion.

An electronic apparatus according to one or more embodiments of the present invention includes a first chassis; a second chassis configured to be adjacent to the first chassis and connected to the first chassis to be relatively rotatable between a first posture in which the first chassis and the second chassis are stacked such that surface normal directions of the first chassis and the second chassis overlap each other, and a second posture in which the surface normal directions of the first chassis and the second chassis are disposed side by side each other on left and right sides; and a display assembly configured to be provided over between the first chassis and the second chassis, and be bent according to relative rotations of the first chassis and the second chassis, in which the display assembly includes a first plate configured to have a first end portion and be fixed to the first chassis, a second plate configured to have a second end portion that is provided to face the first end portion with a predetermined gap and be fixed to the second chassis such that the first plate and the second plate are stacked such that surface normal directions of the first plate and the second plate overlap each other during the first posture and the first plate and the second plate are disposed with the surface normal directions of the first plate and the second plate being aligned side by side each other on left and right sides during the second posture, and a flexible display configured to have a first region fixed to a surface of the first plate, a second region fixed to a surface of the second plate, and a bending region disposed to straddle the gap between the first region and the second region, the bending region of the display is formed with an arc-shaped bent portion at a position protruding from the first end portion and the second end portion during the first posture, and the bent portion has an outer diameter that is larger than a stacked height of the first plate and the second plate in a stacking direction of the first plate and the second plate, and during the first posture, the display is formed with reverse bent portions configured to be bent in a direction opposite to the bent portion at each of a position overlapping the surface of the first plate in a predetermined range from the first end portion and a position overlapping the surface of the second plate in a predetermined range from the second end portion.

A display assembly according to one or more embodiments of the present invention includes a first plate configured to have a first end portion; a second plate configured to have a second end portion that is provided to face the first end portion with a predetermined gap and be disposed side by side with the first plate; and a flexible display configured to have a first region fixed to a surface of the first plate by using a first adhesive member, a second region fixed to a surface of the second plate by using a second adhesive member, and a bending region disposed to straddle the gap between the first region and the second region, in which the first plate and the second plate are connected via the display such that the first plate and the second plate are relatively rotatable between a first posture in which the first plate and the second plate are stacked such that surface normal directions of the first plate and the second plate overlap each other and a second posture in which the surface normal directions of the first plate and the second plate are disposed side by side each other on left and right sides, the bending region of the display is formed with an arc-shaped bent portion at a position protruding from the first end portion and the second end portion during the first posture, and the bent portion has an outer diameter that is larger than a stacked height of the first plate and the second plate in a stacking direction of the first plate and the second plate, the first plate has a first non-adhesive portion in which the first region is not fixed without the first adhesive member being provided in a predetermined range from the first end portion on the surface of the first plate, and the second plate has a second non-adhesive portion in which the second region is not fixed without the second adhesive member being provided in a predetermined range from the second end portion on the surface of the second plate.

One or more of the above-described embodiments of the present invention can suppress the occurrence of a failure of the display due to the bending operation.

DETAILED DESCRIPTION OF THE INVENTION

An electronic apparatus according to the present invention will be described in detail below with respect to one or more embodiments with reference to the accompanying drawings.

Figure 1:
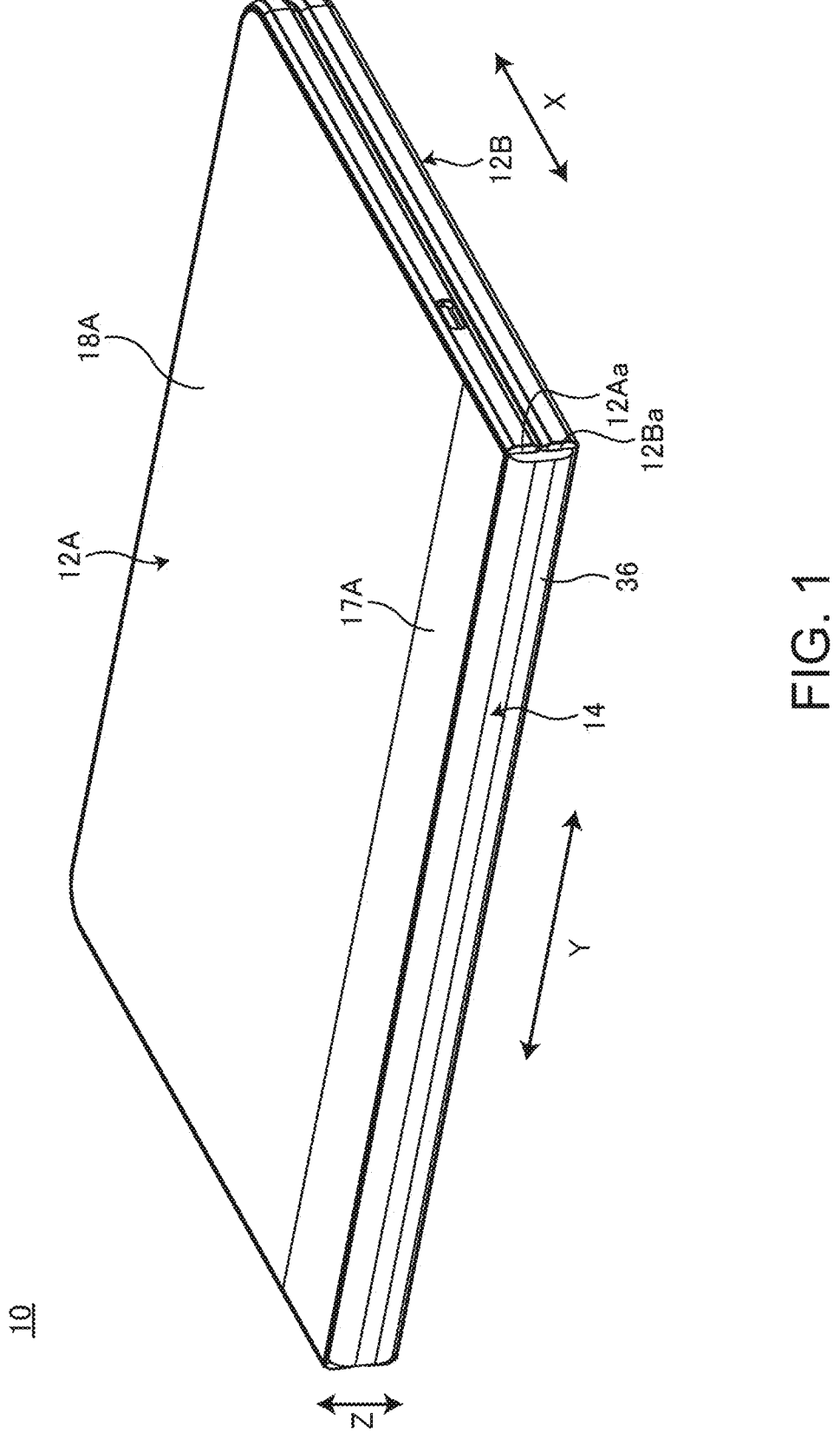
FIG. 1 is a perspective view schematically illustrating a state in which an electronic apparatus according to one or more embodiments is closed and in a 0-degree posture.
Figure 2:
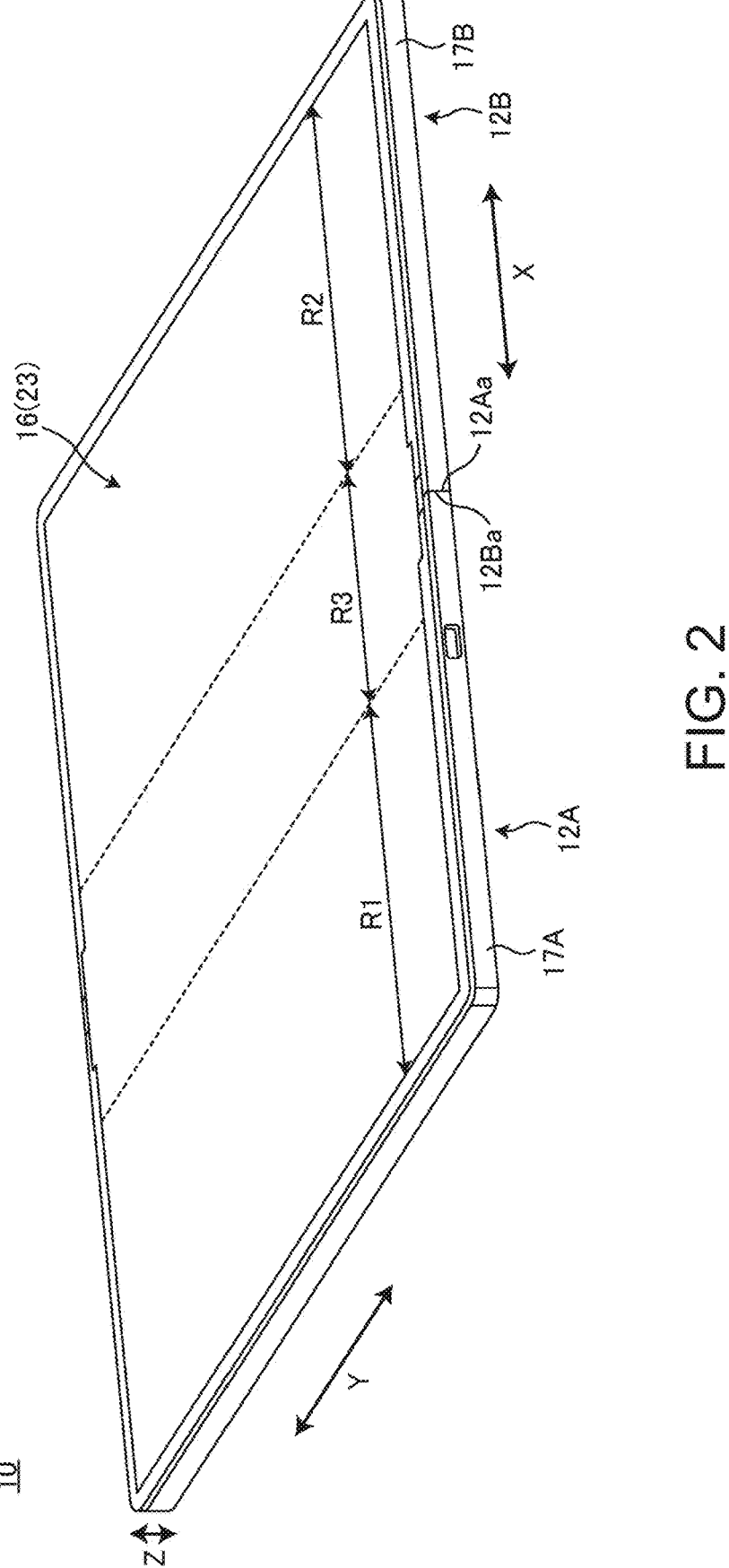
FIG. 2 is a perspective view schematically illustrating a state in which the electronic apparatus illustrated in FIG. 1 is opened and in a 180-degree posture.
Figure 3:
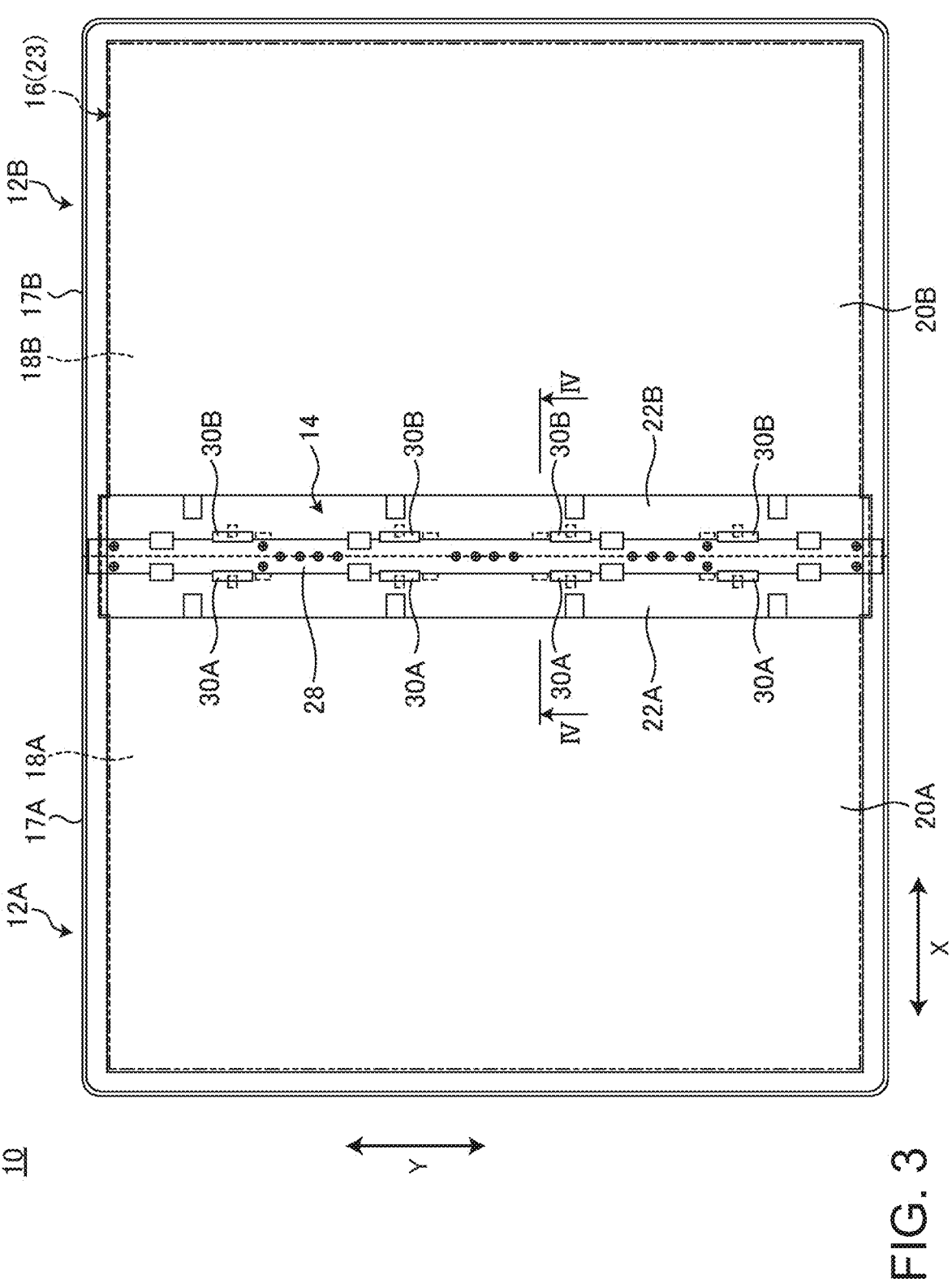
FIG. 3 is a plan view schematically illustrating an internal structure of the electronic apparatus illustrated in FIG. 2.

FIG. 1 is a perspective view schematically illustrating a state in which an electronic apparatus 10 according to one or more embodiments is closed and in a 0-degree posture. FIG. 2 is a perspective view schematically illustrating a state in which the electronic apparatus 10 illustrated in FIG. 1 is opened and in a 180-degree posture. FIG. 3 is a plan view schematically illustrating an internal structure of the electronic apparatus 10 illustrated in FIG. 2.

As illustrated in FIGS. 1 to 3, the electronic apparatus 10 includes a first chassis 12A, a second chassis 12B, a hinge device 14, and a display 16. The electronic apparatus 10 of one or more embodiments exemplifies a tablet PC or a laptop PC that is capable of being folded like a book. The electronic apparatus 10 may be a smartphone, a portable game machine, or the like.

Respective chassis 12A and 12B are disposed adjacent to each other. On each of the chassis 12A and 12B, various electronic components such as a motherboard on which a CPU is mounted, a battery device, an antenna module, and a communication module are appropriately mounted.

The first chassis 12A includes a frame member 17A and a cover member 18A. The frame member 17A is a rectangular frame-shaped member having standing walls formed on three sides other than an adjacent end portion 12Aa adjacent to the second chassis 12B. The cover member 18A is a plate-shaped member that closes a back surface opening of the frame member 17A (see also FIG. 4). Similarly, the second chassis 12B includes a frame member 17B forming standing walls on three sides other than an adjacent end portion 12Ba adjacent to the first chassis 12A, and a cover member 18B that closes a back surface opening of the frame member 17B. Surface openings of the frame members 17A and 17B are closed with the display 16.

Each of the members 17A, 17B, 18A, and 18B is made of, for example, a metal member such as stainless steel, magnesium, or aluminum, a fiber-reinforced resin plate containing reinforcing fibers such as carbon fiber, or the like.

The hinge device 14 connects the chassis 12A and 12B to be relatively rotatable between the 0-degree posture and the 180-degree posture. The hinge device 14 also functions as a back cover that hides a gap between the adjacent end portions 12Aa and 12Ba formed in the 0-degree posture illustrated in FIG. 1. The display 16 extends over between the chassis 12A and 12B.

Hereinafter, as for the electronic apparatus 10, description is performed while a direction in which the chassis 12A and 12B are aligned is called an X direction, a direction along the adjacent end portions 12Aa and 12Ba orthogonal thereto is called a Y direction, and a thickness direction of the chassis 12A and 12B is called a Z direction. As for the angular posture between the chassis 12A and 12B, description is performed while a state of being stacked so as to overlap each other in a surface normal direction is called the 0-degree posture (see FIG. 1), and a state of being aligned in a direction perpendicular to the surface normal direction (X direction) is called the 180-degree posture (see FIGS. 2 and 3). It is possible to call the posture between 0 and 180 degrees by appropriately carving the angle, and for example, a state in which the surface normal directions of the chassis 12A and 12B are orthogonal to each other is a 90-degree posture. These angles are for convenience of description, and an actual product may of course have angular positions slightly deviated from the exact angular positions indicated by angle numbers.

Figure 4:
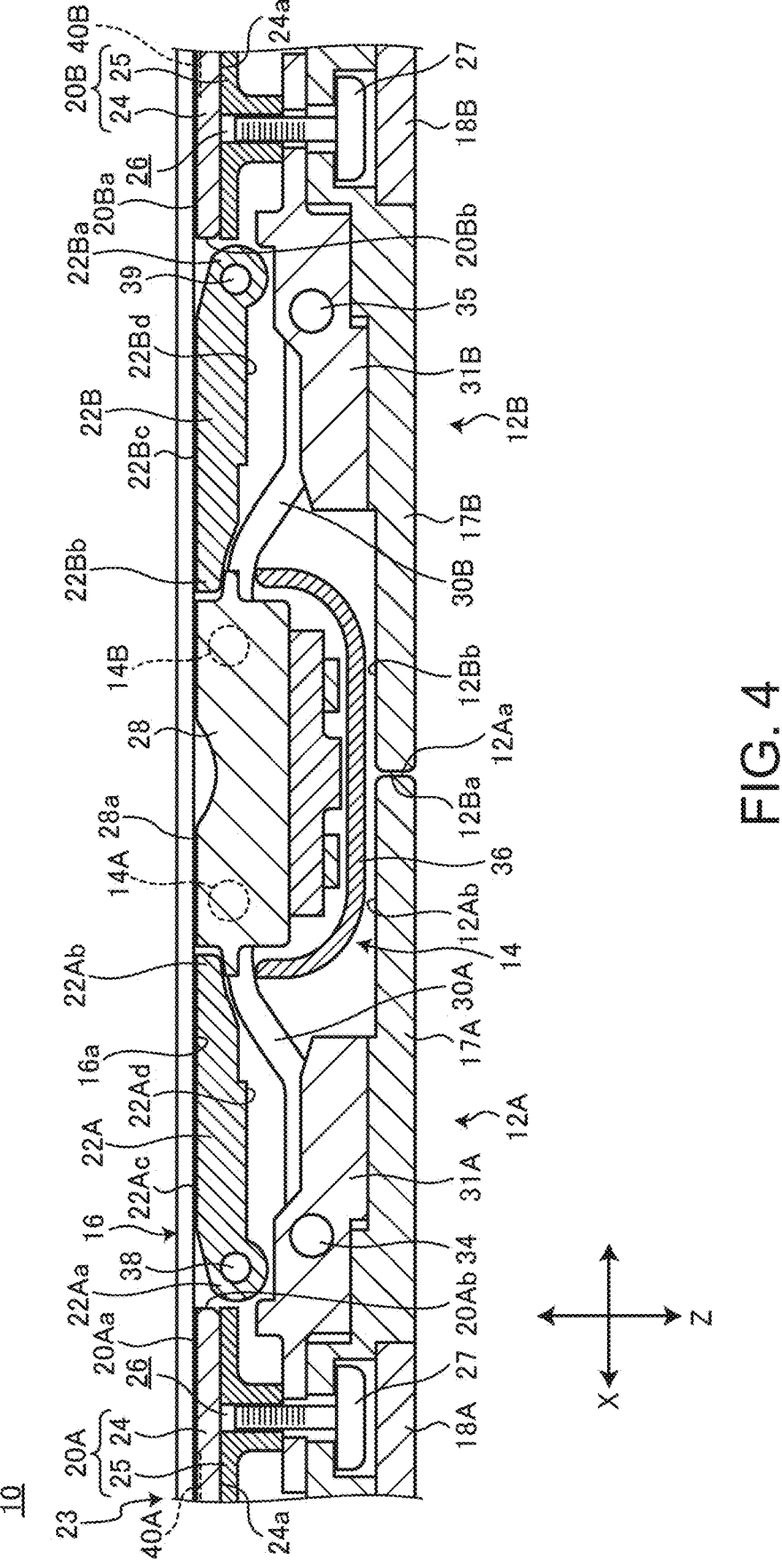
FIG. 4 is a schematic sectional view taken along line IV-IV in FIG. 3.
Figure 5:
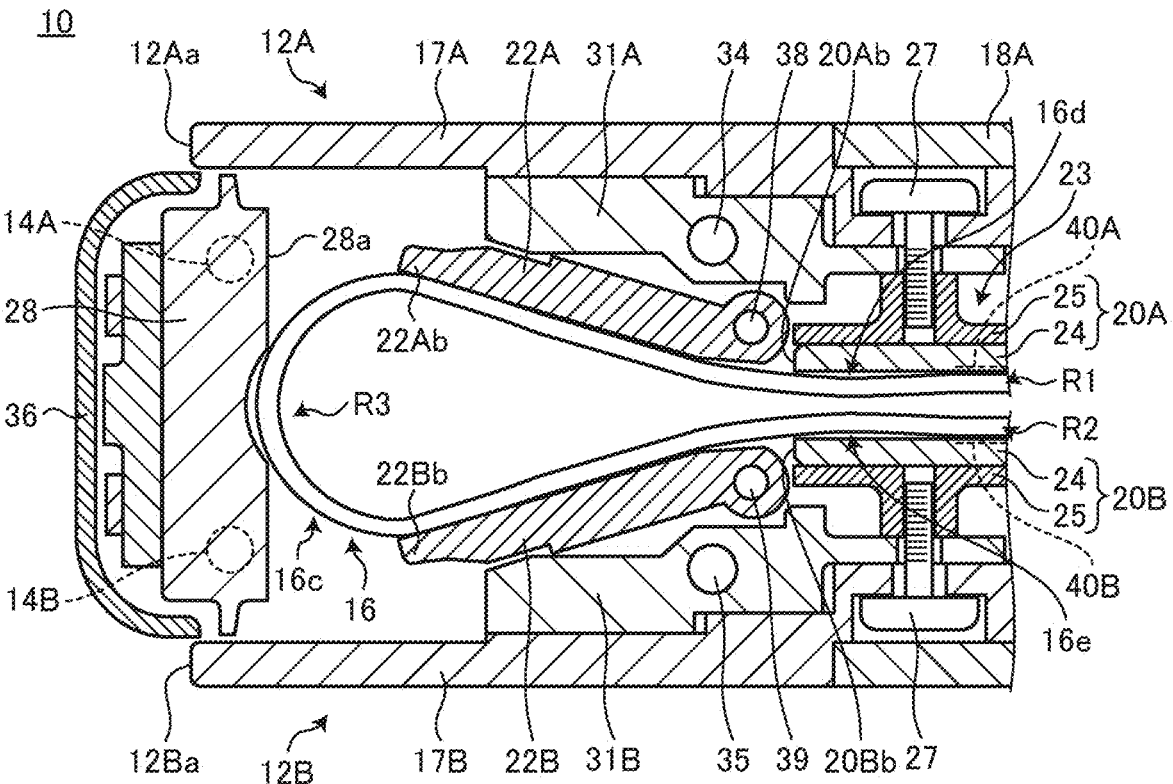
FIG. 5 is a schematic sectional view illustrating a state in which the electronic apparatus illustrated in FIG. 4 is in a 0-degree posture.

FIG. 4 is a schematic sectional view taken along line IV-IV in FIG. 3. FIG. 5 is a schematic sectional view illustrating a state in which the electronic apparatus 10 illustrated in FIG. 4 is in a 0-degree posture.

In the 0-degree posture illustrated in FIG. 1, the chassis 12A and 12B are in a state of being folded in two. The display 16 is, for example, a paper-like flexible display formed of organic EL. During the 0-degree posture, the display 16 is disposed such that a region R1 on a first chassis 12A side faces a region R2 on a second chassis 12B side illustrated in FIG. 2, and a bending region R3, which is a boundary region between the regions R1 and R2, is in a state of being bent in an arc shape. In the 180-degree posture illustrated in FIG. 2, the chassis 12A and 12B are disposed side by side each other on the left and right sides. In this case, the display 16 has the regions R1 and R2, and the bending region R3 disposed side by side on an XY plane, and forms one flat plate shape as a whole (see also FIG. 4).

In the display 16, the region R1 is relatively fixed to the first chassis 12A, and the region R2 is relatively fixed to the second chassis 12B. Specifically, a back surface 16a of the region R1 is fixed to the first chassis 12A via a first plate 20A, and a back surface 16a of the region R2 is fixed to the second chassis 12B via a second plate 20B. The first plate 20A is adjacent to a first support plate 22A of the hinge device 14, and the second plate 20B is adjacent to a second support plate 22B of the hinge device 14 (see FIG. 3).

As illustrated in FIGS. 3 to 5, the plates 20A and 20B are disposed on the left and right sides so as to sandwich the hinge device 14 therebetween, and support the back surface 16a of the display 16 on the surfaces 20Aa and 20Ba, respectively. The back surface 16a of the display 16 has the region R1 adhesively fixed to the surface 20Aa of the first plate 20A and the region R2 adhesively fixed to the surface 20Ba of the second plate 20B. As described above, the display 16 is mounted on the electronic apparatus 10 as a display assembly 23 that is integrally assembled with the plates 20A and 20B.

The plates 20A and 20B are configured of, for example, a base plate 24 and a metal frame 25. The base plate 24 is, for example, a carbon fiber reinforced resin plate in which carbon fibers are impregnated with a matrix resin such as epoxy resin. The metal frame 25 is formed of, for example, magnesium alloy or the like, and fixed to an outer peripheral edge portion of a back surface 24a of the base plate 24.

Since the plates 20A and 20B are formed of the carbon fiber reinforced resin, it is possible to ensure a high flatness and to make the device thinner and lighter. However, the carbon fiber reinforced resin has a concern that the carbon fibers may fall off from the outer peripheral end surface (edge) in powder shapes, and further, shape processing, screw processing, or the like is also difficult. Therefore, the plates 20A and 20B are provided with the metal frame 25 to surround the outer peripheral end surfaces and the outer edge portions of the back surfaces 24a, respectively. The plates 20A and 20B are fixed to the frame members 17A and 17B of the chassis 12A and 12B by screwing screws 27 into screw holes 26 formed in the metal frame 25. The plates 20A and 20B may be formed of a metal material or a resin material, instead of the carbon fiber reinforced resin. In this case, the metal frame 25 may be omitted.

The bending region R3 of the display 16 is relatively movable with respect to the chassis 12A and 12B. During the 180-degree posture, the back surface 16a of the bending region R3 is supported by a hinge main body 28 and the support plates 22A and 22B (see FIG. 4). During the 0-degree posture, the bending region R3 is bent in an arc shape, a part of the back surface 16a is supported by the support plates 22A and 22B, and most portions thereof are separated from the hinge device 14 (see FIG. 5).

As illustrated in FIGS. 3 to 5, the hinge device 14 according to one or more embodiments has the hinge main body 28, the first support plate 22A and the second support plate 22B, a first link arm 30A and a second link arm 30B, and a first bracket 31A and a second bracket 31B. The hinge device 14 is not limited to the configuration illustrated below.

The hinge main body 28 is provided at a position straddling the adjacent end portions 12Aa and 12Ba of the chassis 12A and 12B, and extends over a substantially entire length in the Y direction along the adjacent end portions 12Aa and 12Ba. The hinge main body 28 is a block-shaped component formed of a metal material such as aluminum. Two hinge shafts 14A and 14B aligned in the X direction in the 180-degree posture are supported by the hinge main body 28.

A first end portion of the first link arm 30A is rotatably supported around an axis of first hinge shaft 14A. A first end portion of the second link arm 30B is rotatably supported around an axis of a second hinge shaft 14B. The link arms 30A and 30B have a boomerang-shaped curved shape that is gradually close to inner surfaces 12Ab and 12Bb of the chassis 12A and 12B in a direction separating from the hinge shafts 14A and 14B.

A second end portion of the first link arm 30A is connected to the first bracket 31A by using a rotation shaft 34 to be relatively rotatable. The first bracket 31A is fixed to an inner surface 12Ab of the first chassis 12A using the screws 27 or the like. A second end portion of the second link arm 30B is connected to the second bracket 31B by using a rotation shaft 35 to be relatively rotatable. The second bracket 31B is fixed to an inner surface 12Bb of the second chassis 12B using the screws 27 or the like.

The link arms 30A and 30B, and the brackets 31A and 31B are provided to be aligned in a plurality along the Y direction which is the longitudinal direction of the hinge main body 28 (see FIG. 3). Therefore, the hinge main body 28 connects the chassis 12A and 12B to be relatively rotatable. A gear mechanism for synchronizing the rotation operation between the chassis 12A and 12B, a torque mechanism for applying a predetermined rotational torque to the rotation operation between the chassis 12A and 12B, and the like are also provided inside the hinge main body 28. As illustrated in FIGS. 1 and 5, a back cover component 36 serving as a decorative cover is attached to a back surface of the hinge main body 28.

During the 180-degree posture illustrated in FIG. 4, the hinge main body 28 supports the back surface 16a of the bending region R3 of the display 16 on the surface 28a. In this case, the hinge main body 28 is housed in the chassis 12A and 12B and is disposed to straddle the adjacent end portions 12Aa and 12Ba which are close to or in contact with each other in the X direction. During the 0-degree posture illustrated in FIG. 5, the hinge main body 28 is disposed to close a gap between the adjacent end portions 12Aa and 12Ba largely spaced from each other, and serves as the back cover of the electronic apparatus 10 folded like a book. In this case, the back cover component 36 is exposed to the outermost surface, so that an appearance design of the folded electronic apparatus 10 is prevented from being deteriorated (see FIG. 1).

The support plates 22A and 22B are plates formed of a metal material such as aluminum, and have bilaterally symmetrical shapes. The support plates 22A and 22B are provided on the inner surfaces 12Ab and 12Bb sides of the chassis 12A and 12B, and extend over the substantially entire length in the Y direction along the adjacent end portions 12Aa and 12Ba.

The first support plate 22A is disposed between the first plate 20A and the hinge main body 28. The first support plate 22A has an edge portion 22Aa on the first plate 20A side, which is connected to the first bracket 31A to be relatively rotatable via a rotation shaft 38. As a result, the first support plate 22A is relatively moved with respect to the first plate 20A to be rotated. The first support plate 22A has an edge portion 22Ab on the hinge main body 28 side, which is relatively movable with respect to the hinge main body 28.

The second support plate 22B is disposed between the second plate 20B and the hinge main body 28. The second support plate 22B has an edge portion 22Ba on the second plate 20B side, which is connected to the second bracket 31B to be relatively rotatable via a rotation shaft 39. As a result, the second support plate 22B is relative moved with respect to the second plate 20B to be rotated. The second support plate 22B has an edge portion 22Bb on the hinge main body 28 side, which is relatively movable with respect to the hinge main body 28.

The support plates 22A and 22B swing around the rotation shafts 38 and 39 as rotation centers in accordance with the rotation operation of the chassis 12A and 12B. During the 180-degree posture, the support plates 22A and 22B support the back surface 16a of the bending region R3 of the display 16 by the surfaces 22Ac and 22Bc. In an angular posture other than 180 degrees, the support plates 22A and 22B come into contact with the display 16 in a state in which a gap is provided with the display 16 or with a slight force that does not deform the display 16 (see FIG. 5). In the case of one or more embodiments, the support plates 22A and 22B are able to support the bending region R3 of the display 16 in the 0-degree posture and to correct the shape thereof. As described above, during the 180-degree posture, the support plates 22A and 22B stably support the bending region R3 of the display 16 in a plane, but do not hinder a bending operation of the bending region R3. The support plates 22A and 22B may be components other than the components of the hinge device 14, and may be configured, for example, such that the rotation shafts 38 and 39 are directly supported by the chassis 12A and 12B.

During the 180-degree posture illustrated in FIG. 4, the end portions 20Ab and 20Bb of the plates 20A and 20B on the support plates 22A and 22B sides, and the edge portions 22Aa and 22Ba of the support plates 22A and 22B form one plane without a step. Similarly, the edge portions 22Ab and 22Bb of the support plates 22A and 22B, and the hinge main body 28 also form one plane without a step. Therefore, during the 180-degree posture, the electronic apparatus 10 has a configuration in which the back surface 16a of the display 16 forming one large flat screen is supported by substantially one flat plate. Therefore, a product defect such as curving, undulation, poor visibility, or display defect of the display 16 is suppressed.

Next, a specific configuration example of the display assembly 23 will be described.

Figure 6:
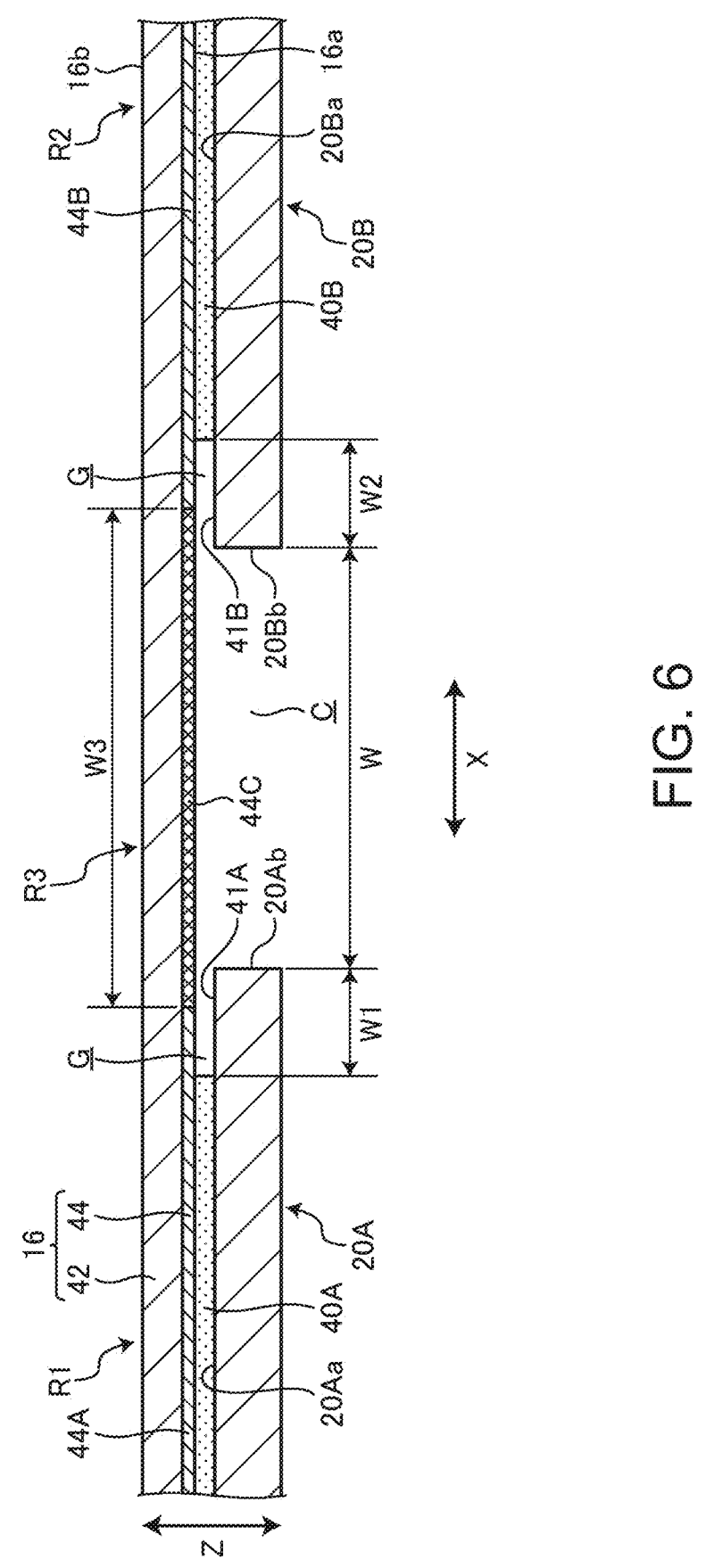
FIG. 6 is a schematic side sectional view of a display assembly.
Figure 7:
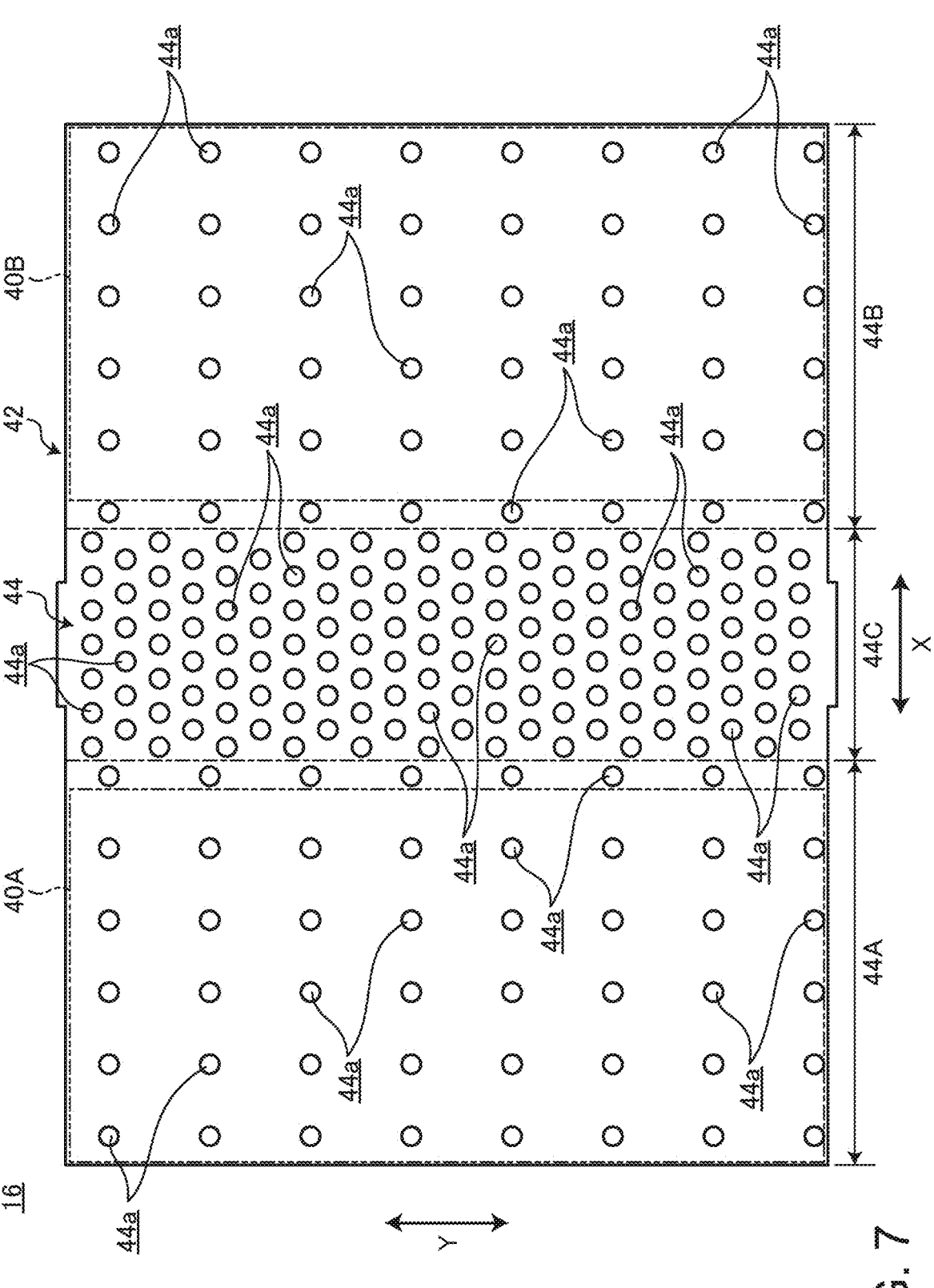
FIG. 7 is a schematic bottom view of a display.
Figure 8:
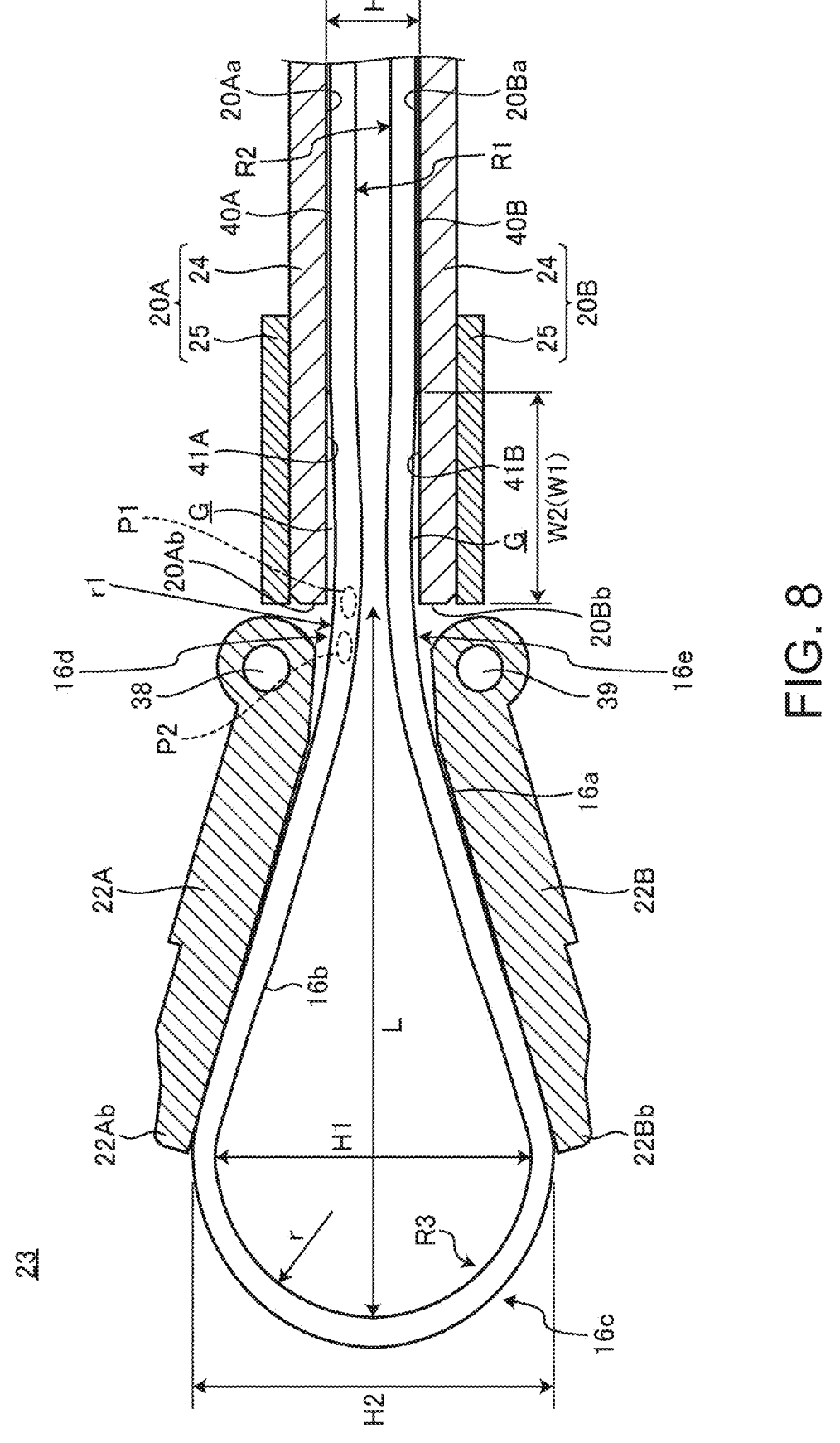
FIG. 8 is a side sectional view schematically illustrating a state in which the display assembly is in a 0-degree posture.

FIG. 6 is a schematic side sectional view of the display assembly 23. FIG. 7 is a schematic bottom view of the display 16. FIG. 8 is a side sectional view schematically illustrating a state in which the display assembly 23 is in the 0-degree posture. In FIG. 6, the plates 20A and 20B are simply illustrated as one plate. In FIG. 8, the support plates 22A and 22B are also illustrated together with the display assembly 23.

As illustrated in FIG. 6, the display assembly 23 is obtained by fixing the region R1 of the display 16 to the surface 20Aa of the first plate 20A with a first adhesive member 40A and fixing the region R2 to the surface 20Ba of the second plate 20B with a second adhesive member 40B. The adhesive members 40A and 40B are, for example, a double-sided tape or an adhesive. The end portions 20Ab and 20Bb of the plates 20A and 20B face each other with a predetermined gap C provided therebetween in the 180-degree posture illustrated in FIG. 6. The gap C is a space in which the hinge main body 28 and the support plates 22A and 22B are disposed. In one or more embodiments, a width W of the gap C in the X direction is, for example, 36 mm.

As described above, the display assembly 23 has a configuration in which the two plates 20A and 20B are connected to the display 16 having flexibility. As a result, the display assembly 23 is able to relatively rotate the plates 20A and 20B between the 0-degree posture and the 180-degree posture via the display 16.

The display 16 has a configuration in which a sheet-like member 44 is stacked on the back surface of the display body 42. The display 16 has flexibility as a whole.

The display body 42 is, for example, a plastic organic electro-luminescence diode (POLED). The display body 42 includes an active region forming the display surface 16*b* and a non-active region provided around the active region. The active region is a region in which an image is displayed, and pixels arranged in a matrix shape are disposed. The non-active region is a region in which the image is not displayed, and for example, a wiring line, a terminal, a driving circuit, or the like is disposed. A surface sheet, in which a polarizing film is stacked under a functional film including an antifingerprint functional layer or the like, is stacked on and adhesively fixed to the display surface 16*b* of the display body 42.

The sheet-like member 44 forms the back surface 16*a* of the display 16. The sheet-like member 44 is adhesively fixed to a back surface opposite to the display surface 16*b* of the display body 42 to cover the back surface. The sheet-like member 44 has a certain tension and is for ensuring a curvature radius when the display body 42 is bent, equivalent to a design specification. The sheet-like member 44 may be omitted depending on the structure, the material, or the like of the display body 42.

The sheet-like member 44 according to one or more embodiments includes portions 44A and 44B that cover the regions R1 and R2, and a portion 44C that covers the bending region R3. In the sheet-like member 44, the bending strength of the portions 44A and 44B is larger than the bending strength of the portion 44C. Here, the bending strength refers to a difficulty in bending when an external force in an out-of-plane direction (Z direction) is applied to the sheet-like member 44. That is, it is able to be said that the portions 44A and 44B have a rigidity larger than a rigidity of the portion 44C. Alternatively, it is able to be said that the portions 44A and 44B are harder than the portion 44C in terms of the material.

The sheet-like member 44 is able to be configured of, for example, a punched metal sheet, a mesh sheet, or the like in which a large number of hole portions 44*a* penetrate and are formed on a metal sheet made of stainless steel (see FIG. 7). The sheet-like member 44 is able to easily change the bending strength thereof by changing an opening ratio of the hole portions 44*a* in the portions 44A and 44B, and the portion 44C. Specifically, the opening ratio of the hole portions 44*a* in the portions 44A and 44B is smaller than the opening ratio of the hole portions 44*a* in the portion 44C. As a result, the portions 44A and 44B constitute hard portions having the bending strength larger than the bending strength of the portion 44C, and conversely, the portion 44C constitutes a soft portion having the bending strength smaller than those of the portions 44A and 44B. Therefore, the bending strength of the entire display 16 is larger in the regions R1 and R2 in which the portions 44A and 44B are fixed than in the bending region R3 in which the portion 44C is fixed.

The portions 44A and 44B may be provided without the hole portions 44*a*. A cross-sectional shape of the hole portion 44*a* may be a circle, a rectangle, a polygon, or the like, or may be an elongated slit or the like. In FIG. 6, the hole portion 44*a* is not illustrated. A difference in bending strength between the portions 44A and 44B, and the portion 44C may be increased by a method other than changing the opening ratio of the hole portions 44*a*, for example, by increasing thicknesses of the portions 44A and 44B larger than a thickness of the portion 44C. The change in the bending strength of the sheet-like member 44 is provided for the purpose of facilitating bending in the bending region R3, durability against the repeated bending operation, suppressing stress concentration in a bent portion 16*c* during the 0-degree posture, or the like. However, the sheet-like member 44 may have a uniform bending strength as a whole.

As illustrated in FIG. 6, the first adhesive member 40A is provided on most portions of the surface 20Aa of the first plate 20A, but is not provided in a predetermined range (width W1) from the end portion (first end portion) 20Ab in the X direction. That is, the first plate 20A has a first non-adhesive portion 41A in which the region R1 of the display 16 is not fixed without providing the first adhesive member 40A in the range of the width W1 along the end portion 20Ab of the surface 20Aa. Similarly, the second adhesive member 40B is provided on most portions of the surface 20Ba of the second plate 20B, but is not provided in a predetermined range (width W2) from the end portion (second end portion) 20Bb in the X direction. That is, the second plate 20B has a second non-adhesive portion 41B in which the region R2 of the display 16 is not fixed without providing the second adhesive member 40B in the range of the width W2 along the end portion 20Bb of the surface 20Ba. Therefore, it is able to also be said that the non-adhesive portions 41A and 41B form the gap G corresponding to the thickness of the adhesive members 40A and 40B between the display 16 and the surfaces 20Aa and 20Ba.

Details will be described below, and in one or more embodiments the widths W1 and W2 of the non-adhesive portions 41A and 41B have a relationship of $(0.1 \leq W1/W \leq 0.4)$ and $(0.1 \leq W2/W \leq 0.4)$, respectively, with respect to the width W between the end portions 20Ab and 20Bb of the plates 20A and 20B. In one or more embodiments, the widths W1 and W2, and the width W have a relationship of $(0.15 \leq W1/W \leq 0.25)$ and $(0.15 \leq W2/W \leq 0.25)$. In one or more embodiments, the width W is 36 mm, the widths W1 and W2 are each set to 7 mm, and (W1/W) and (W2/W) are both approximately 0.19.

In the sheet-like member 44 according to one or more embodiments, a width W3 of the portion 44C in the X direction is set to 39 mm. Therefore, both ends of the portion 44C in the X direction each overlap the plates 20A and 20B by 1.5 mm in the Z direction. In other words, the portions 44A and 44B each overlap the non-adhesive portions 41A and 41B by 5.5 mm in the X direction, in the Z direction.

Next, operations and effects when the display assembly 23 is in the 0-degree posture will be described.

When the chassis 12A and 12B are folded into the 0-degree posture (see FIG. 5), the display assembly 23 changes to an aspect as illustrated in FIG. 8. That is, the plates 20A and 20B are integrally rotated with the chassis 12A and 12B, and are disposed to be stacked on each other. In this case, the positions of the end portions 20Ab and 20Bb substantially match in the stacking direction. A stacked height of the plates 20A and 20B in the stacking direction at this time is referred to as a height H. On the other hand, the bending region R3 of the display 16 is formed with the arc-shaped bent portion 16*c* at a position that protrudes outward from the end portions 20Ab and 20Bb of the stacked plates 20A and 20B. In bent portion 16*c*, both an inner diameter H1 and an outer diameter H2 of the plates 20A and 20B in the stacking direction are larger than the height H (H<H1, H2). Therefore, the bent portion 16*c* has a substantially bell shape or a substantially bulb shape in a side view. In addition, the back surface 16*a* of a part of the bending region R3 between the bent portion 16*c* and the end portions 20Ab and 20Bb is pressed by the support plates 22A and 22B to smoothly incline.

As described above, the display 16 according to one or more embodiments forms the bent portion 16*c* having a substantially bell shape at a position that protrudes from the end portions 20Ab and 20Bb of the plates 20A and 20B during the 0-degree posture. Therefore, the display 16 forms, with respect to the bent portion 16c that is inwardly bent to include the display surface 16b on the inside thereof, outwardly-bent portions 16d and 16e which are reversed to the bent portion 16c near the end portions 20Ab and 20Bb, respectively. Here, the inward-bent refers to bent in which a center of a curvature radius r is located on the inside (display surface 16b side) of the bent portion 16c. The outward-bent refers to bent in which a center of a curvature radius r1 is located on the outside (back surface 16a side) of the bent portion 16c. In FIG. 8, the curvature radius r1 is illustrated only for one outwardly-bent portion 16d, but since the other outwardly-bent portion 16e has a substantially symmetrical shape thereto, the curvature radius r1 is not illustrated and the same applies to FIGS. 9 to 11.

In this case, if the curvature radius r1 of the outwardly-bent portions 16d and 16e is too small, a shear stress is concentrated on the outwardly-bent portions 16d and 16e. As a result, there is a concern that the display 16 may cause a failure such as the sheet-like member 44 being peeled off from the display 16 or the display body 42, which is a stacked body, being interlayer-peeled.

Therefore, the display assembly 23 according to one or more embodiments has the non-adhesive portions 41A and 41B in which the display 16 is not fixed in the predetermined ranges (widths W1 and W2) from the end portions 20Ab and 20Bb of the surfaces 20Aa and 20Ba of the plates 20A and 20B. As a result, during the 0-degree posture, the display 16 is formed with the outwardly-bent portions 16d and 16e from the positions overlapping the non-adhesive portions 41A and 41B. Therefore, the display 16 is prevented from rapidly forming the outwardly-bent portions 16d and 16e from the end portions 20Ab and 20Bb, and the curvature radius r1 is increased, so that the occurrence of the above-described failure is able to be suppressed.

Here, results of the comparison between the display assembly 23 according to the example illustrated in FIG. 8 and a display assembly 50 according to a comparative example illustrated in FIG. 9 in the simulation experiment will be described.

Figure 9:
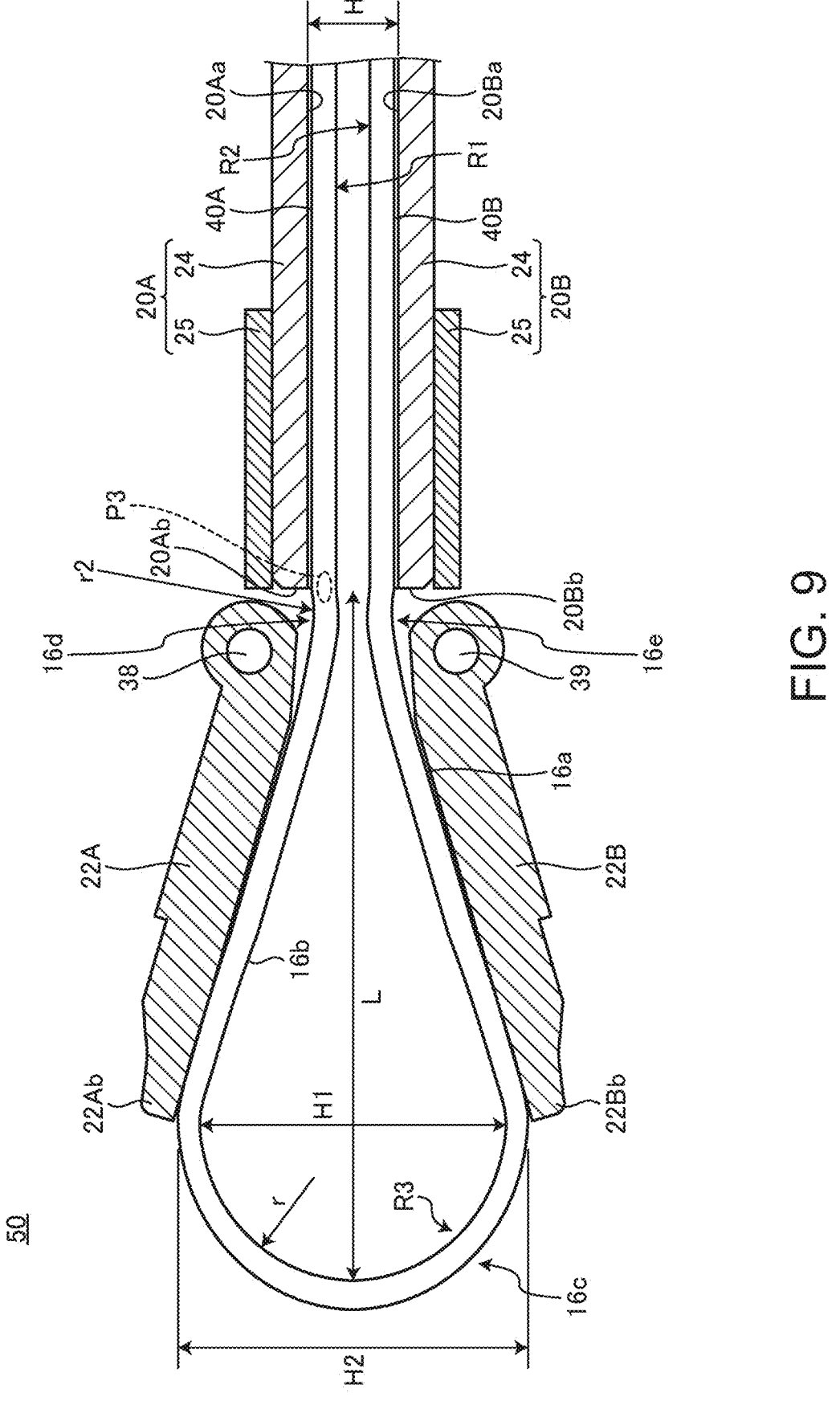
FIG. 9 is a side sectional view schematically illustrating a state in which a display assembly according to a comparative example is in a 0-degree posture.

The display assembly 50 according to the comparative example illustrated in FIG. 9 is the same as the display assembly 23 according to the example illustrated in FIG. 8, except that the non-adhesive portions 41A and 41B are not provided, and the adhesive members 40A and 40B are provided on the entire surfaces of the surfaces 20Aa and 20Ba of the plates 20A and 20B to fix the display 16.

First, in the configuration example illustrated in FIG. 8, the stacked height H of the plates 20A and 20B was set to 2.2 mm, the curvature radius r of the bent portion 16c was set to 3.0 mm, the inner diameter H1 of the bent portion 16c was set to 6.6 mm, the outer diameter H2 was set to 7.6 mm obtained by adding twice the thickness (for example, 0.5 mm) of the display 16 to the H1, and the protruding distance L of the bending region R3 from the end portions 20Ab and 20Bb was set to 15.8 mm. In this case, the curvature radius r1 of the outwardly-bent portions 16d and 16e was 21.0 mm.

On the other hand, in comparative example illustrated in FIG. 9, the stacked height H of the plates 20A and 20B was set to 2.2 mm, the curvature radius r of the bent portion 16c was set to 3.0 mm, the inner diameter H1 of the bent portion 16c was set to 6.6 mm, the outer diameter H2 was set to 7.6 mm, and the protruding distance L of the bending region R3 from the end portions 20Ab and 20Bb was set to 15.8 mm. In this case, the curvature radius r2 of the outwardly-bent portions 16d and 16e was 15.9 mm.

As illustrated in the above-described experimental results, the curvature radius of the outwardly-bent portions 16d and 16e was 21.0 mm in the curvature radius r1 of the example, and the curvature radius r2 of the comparative example was 15.9 mm. That is, the result was that the curvature radius r1 of the example was significantly larger than the curvature radius r2 of the comparative example, which was 15.9 mm. Therefore, it was found that the display assembly 23 of the example is able to suppress the stress concentration at the outwardly-bent portions 16d and 16e as compared with the display assembly 50 of the comparative example, and is able to further suppress the occurrence of the above-described failure of the display 16. The reason for this is that the display assembly 50 of the comparative example does not have the non-adhesive portions 41A and 41B. As a result, it is considered that the display assembly 50 is rapidly started to form with the outwardly-bent portions 16d and 16e from the end portions 20Ab and 20Bb of the plates 20A and 20B and the curvature thereof is increased.

Furthermore, as a result of the experiment, in the example of FIG. 8, the stress generated in the display 16 due to the stress concentration was particularly high at two points of the positions P1 and P2, and the stress at the position P1 was 7.2 MPa and the stress at the position P2 was 7.0 MPa. On the other hand, in the comparative example of FIG. 9, the stress generated in the display 16 due to the stress concentration was particularly high at one point of the position P3, and was 17.0 MPa. From this, it was clarified that the stress peak of the display 16 in the display assembly 23 of the example was significantly lower than the stress peak of the comparative example. An offset distances of the positions P1 to P3 from the end portion 20Ab to the bent portion 16c side were 0.2 mm for the positions P1 and P3, and 2.8 mm for the position P2.

As described above, the electronic apparatus 10 and the display assembly 23 according to one or more embodiments have a configuration in which the bending region R3 of the display 16 is formed with the arc-shaped bent portion 16c at the position that protrudes outward from the end portions 20Ab and 20Bb of the plates 20A and 20B during the 0-degree posture. The surfaces 20Aa and 20Ba of the plates 20A and 20B have the non-adhesive portions 41A and 41B in which the display 16 is not fixed in the predetermined ranges (widths W1 and W2) from the end portions 20Ab and 20Bb, respectively. Therefore, in the display 16, the curvature radius r1 of the outwardly-bent portions 16d and 16e in which the bending directions are reversed is able to be increased, and the occurrence of the failure such as interlayer-peeling is able to be suppressed.

In other words, the display assembly 23 is provided with the gap G between the display 16 and the surfaces 20Aa and 20Ba of the plates 20A and 20B in the predetermined ranges (W1 and W2) from the end portions 20Ab and 20Bb, respectively. Therefore, during the 0-degree posture illustrated in FIG. 8, the display 16 is also able to form the outwardly-bent portions 16d and 16e by using the ranges (widths W1 and W2) offset from the end portions 20Ab and 20Bb toward the center of the plates 20A and 20B. As a result, the display 16 is able to increase the curvature radius r1 at the outwardly-bent portions 16d and 16e.

In other words, during the 0-degree posture, the display 16 is formed with the reverse bent portions (outwardly-bent portions 16d and 16e) that are bent in a direction opposite to the bent portion 16c in the predetermined ranges (widths W1 and W2) from the end portions 20Ab and 20Bb at positions overlapping the surfaces 20Aa and 20Ba of the plates 20A and 20B. Therefore, the display 16 is able to increase the curvature radius r1 at the outwardly-bent portions 16d and 16e.

Meanwhile, even if the widths W1 and W2 are further increased from the above-described 7 mm (for example, 15 mm), there is an advantage that the curvature radius r1 itself is increased and the stress concentration is able to be further relaxed. However, in this case, the display 16 is started to form with the outwardly-bent portions 16d and 16e at positions considerably retracted from the end portions 20Ab and 20Bb of the plates 20A and 20B. Therefore, there is a concern that the display 16 is significantly raised between the plates 20A and 20B, and comes into contact therewith, or the bezel member attached to the display surface 16b is peeled off. On the other hand, if the widths W1 and W2 are too small, the curvature radius r1 is reduced. Therefore, the display assembly 23 according to one or more embodiments balances the merit and the demerit by setting the widths W1 and W2 with respect to the width W to have the relationship of $(0.1 \leq W1/W \leq 0.4)$ and $(0.1 \leq W2/W \leq 0.4)$. In one or more embodiments, the relationship is $(0.15 \leq W1/W \leq 0.25)$ and $(0.15 \leq W2/W \leq 0.25)$.

The display assembly 23 is also able to be provided with a hard portion having the bending strength larger than the bending strength of the portion covering the bending region R3 at the portions overlapping the non-adhesive portions 41A and 41B of the display 16 by changing the bending strength of the sheet-like member 44. In this case, at the positions overlapping the non-adhesive portions 41A and 41B, excessive deflection or bending of the outwardly-bent portions 16d and 16e of the display 16 is suppressed. As a result, the curved shape of the outwardly-bent portions 16d and 16e is further gentle, and the curvature radius r1 is further increased.

Figure 10:
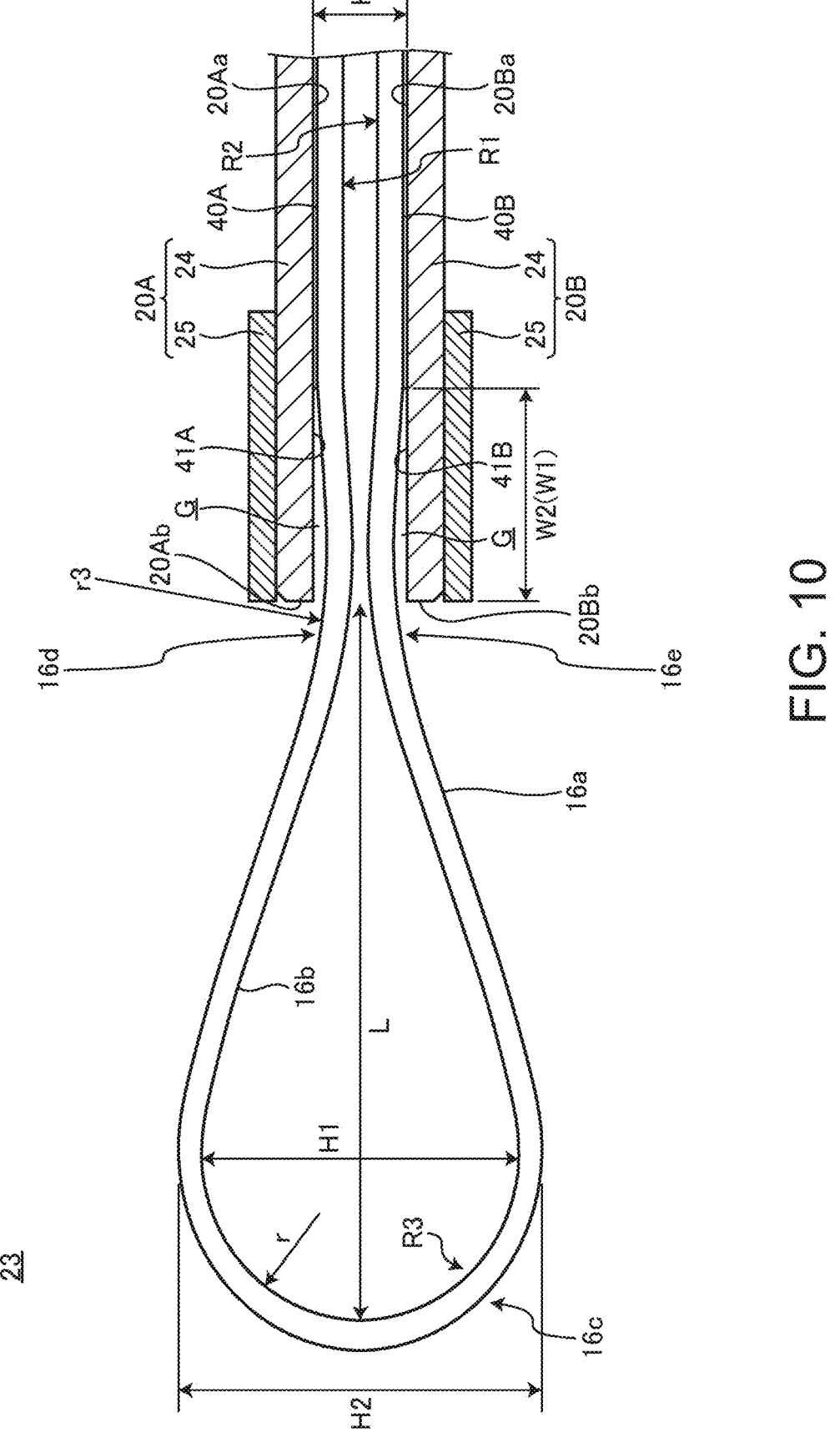
FIG. 10 is a side sectional view schematically illustrating a state in which the display assembly is in the 0-degree posture in a configuration in which support plates are not provided.
Figure 11:
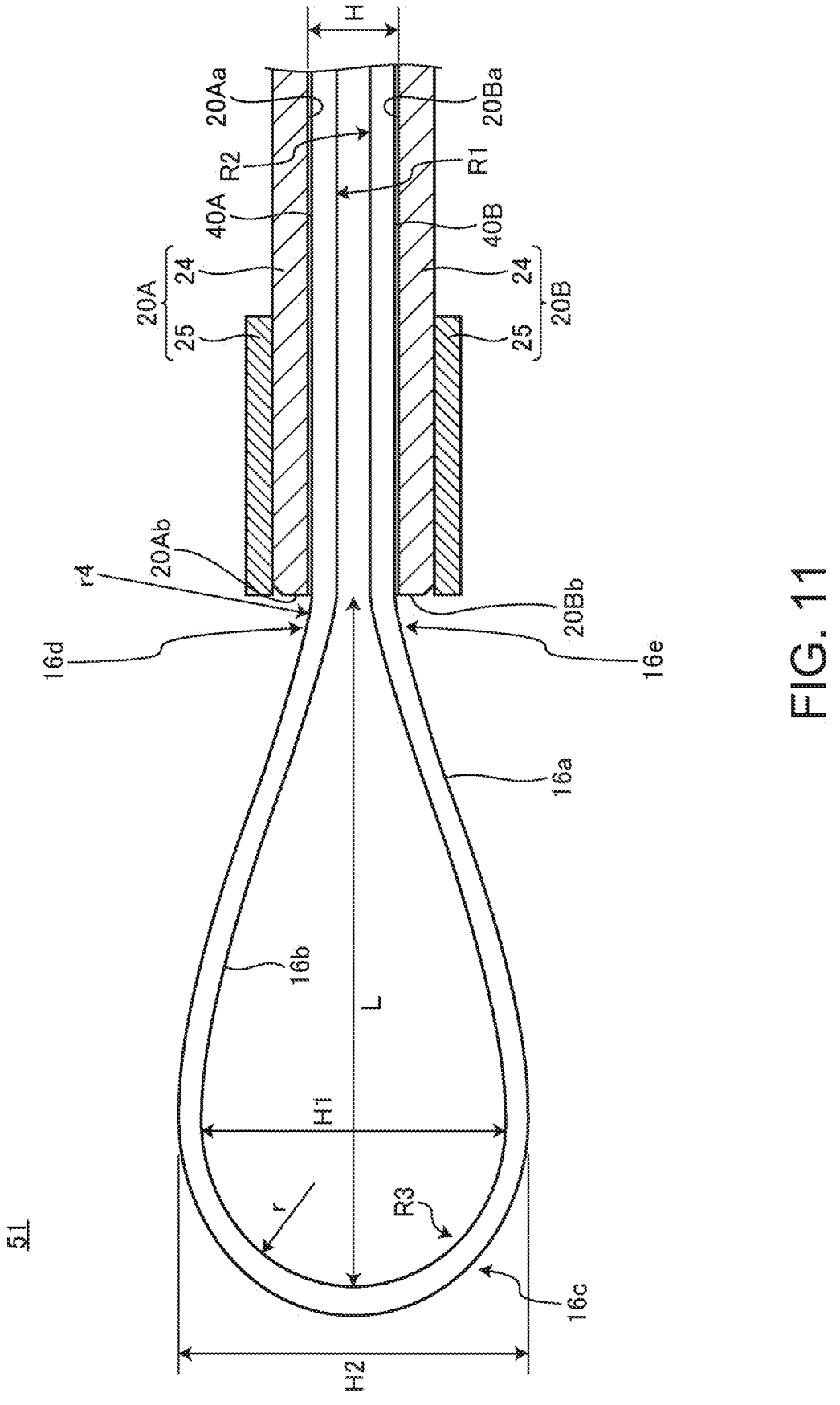
FIG. 11 is a side sectional view schematically illustrating a state in which the display assembly according to a comparative example of the configuration example illustrated in FIG. 10 is in the 0-degree posture.

FIG. 10 is a side sectional view schematically illustrating a state in which the display assembly 23 is in the 0-degree posture in a configuration in which the support plates 22A and 22B are not provided. FIG. 11 is a side sectional view schematically illustrating a state in which a display assembly 51 according to a comparative example of the configuration example illustrated in FIG. 10 is in the 0-degree posture. In FIGS. 10 and 11, since the same reference numerals as the reference numerals illustrated in FIGS. 1 to 9 indicate the same or similar configurations, the same or similar functions and effects are achieved, and detailed description thereof will be omitted.

The electronic apparatus 10 described above includes the support plates 22A and 22B, and the support plates 22A and 22B have a function of correcting the shape of the bending region R3 of the display 16 during the 0-degree posture. However, the correction function by the support plates 22A and 22B is not essential.

That is, as illustrated in FIG. 10, the electronic apparatus 10 may have a configuration in which the display 16 is not supported by the members (support plates 22A and 22B) between the bent portion 16c and the end portions 20Ab and 20Bb during the 0-degree posture. The display assembly 51 of the comparative example illustrated in FIG. 11 is the same as the display assembly 23 illustrated in FIG. 10 in terms of other configurations, except that the non-adhesive portions 41A and 41B are not provided, and the adhesive members 40A and 40B are provided on the entire surfaces 20Aa and 20Ba of the plates 20A and 20B to fix the display 16.

In the configuration example illustrated in FIG. 10, in the display 16, the height of the gap G at the position overlapping the non-adhesive portions 41A and 41B is higher than that in the configuration example illustrated in FIG. 8. This is because the support plates 22A and 22B do not have the correction function of the display 16. As a result, a curvature radius r3 of the outwardly-bent portions 16d and 16e illustrated in FIG. 10 is slightly smaller than the curvature radius r1 of the outwardly-bent portions 16d and 16e illustrated in FIG. 8. However, the curvature radius r3 is sufficiently larger than a curvature radius r4 of the display assembly 51 of the comparative example illustrated in FIG. 11. Therefore, in the display assembly 23 illustrated in FIG. 10, the occurrence of the failure of the display 16 in the outwardly-bent portions 16d and 16e is able to be suppressed as compared with the display assembly 51 illustrated in FIG. 11.

It goes without saying that the present invention is not limited to the embodiments described above, and is able to be freely modified without departing from the gist of the present invention.

In the above, the electronic apparatus 10 that is able to be folded in half like a book is exemplified. It is possible to apply the present invention to, in addition to a configuration of folding the same-shaped chassis in half, for example, various configurations, such as a double-door configuration in which small chassis are foldably connected to the left and right edge portions of a large chassis, an S-shaped folding configuration in which chassis with different folding directions are connected to the left and right edge portions of one chassis, and a J-shaped folding configuration in which a small chassis is foldably connected to one of the left and right edge portions of a large chassis, and the number of chassis to be connected may be four or more.

DESCRIPTION OF SYMBOLS 10 electronic apparatus
12A first chassis
12B second chassis
16 display
16c bent portion
16d, 16e outwardly-bent portion
20A first plate
20B second plate
22A first support plate
22B second support plate
23, 50, 51 display assembly
40A first adhesive member
40B second adhesive member
41A first non-adhesive portion
41B second non-adhesive portion
42 display body
44 sheet-like member

What is claimed is:

1. An electronic apparatus, comprising:
a first chassis;
a second chassis configured to be adjacent to the first chassis and connected to the first chassis to be relatively rotatable between a first posture in which the first chassis and the second chassis are stacked such that surface normal directions of the first chassis and the second chassis overlap each other, and a second posture in which the surface normal directions of the first chassis and the second chassis are disposed side by side each other on left and right sides; and
a display assembly configured to be provided over between the first chassis and the second chassis, and be bent according to relative rotations of the first chassis and the second chassis,
wherein the display assembly includes a first plate configured to have a first end portion and be fixed to the first chassis, a second plate configured to have a second end portion that is provided to face the first end portion with a predetermined gap and be fixed to the second chassis such that the first plate and the second plate are stacked such that surface normal directions of the first plate and the second plate overlap each other during the first posture and the first plate and the second plate are disposed with the surface normal directions of the first plate and the second plate being aligned side by side each other on left and right sides during the second posture, and a flexible display configured to have a first region fixed to a surface of the first plate by using a first adhesive member, a second region fixed to a surface of the second plate by using a second adhesive member, and a bending region disposed to straddle the gap between the first region and the second region, the bending region of the display is formed with an arc-shaped bent portion at a position protruding from the first end portion and the second end portion during the first posture, and the bent portion has an outer diameter that is larger than a stacked height of the first plate and the second plate in a stacking direction of the first plate and the second plate, the first plate has a first non-adhesive portion in which the first region is not fixed without the first adhesive member being provided in a predetermined range from the first end portion on the surface of the first plate, and the second plate has a second non-adhesive portion in which the second region is not fixed without the second adhesive member being provided in a predetermined range from the second end portion on the surface of the second plate.

2. The electronic apparatus according to claim 1, wherein, when based on an alignment direction of the first plate and the second plate in the second posture, when a width of the gap between the first end portion and the second end portion is referred to as W, a width of the first non-adhesive portion on the surface of the first plate is referred to as W1, and a width of the second non-adhesive portion on the surface of the second plate is referred to as W2, W and W1 satisfy a relationship of $0.1 \leq W1/W \leq 0.4$, and
W and W2 satisfy a relationship of $0.1 \leq W2/W \leq 0.4$.

3. The electronic apparatus according to claim 1, wherein the display includes a display body configured to have a display surface on which an image is displayed, and a sheet-like member configured to be fixed to a back surface opposite to the display surface of the display body to cover the back surface, and the sheet-like member includes a hard portion configured to have a bending strength larger than a bending strength of a portion covering the bending region, at each of portions overlapping the first non-adhesive portion and the second non-adhesive portion.

4. The electronic apparatus according to claim 1, further comprising:

a first support plate configured to be provided in the gap along the first end portion, be moved relative to the first plate as the first chassis and the second chassis are rotated, and press a back surface of the display between the bent portion and the first end portion during the first posture, and a second support plate configured to be provided in the gap along the second end portion, be moved relative to the second plate as the first chassis and the second chassis are rotated, and press the back surface of the display between the bent portion and the second end portion during the first posture.

5. The electronic apparatus according to claim 1, wherein a gap is provided between the display and a surface of the first plate at a position overlapping the first non-adhesive portion, and a gap is provided between the display and a surface of the second plate at a position overlapping the second non-adhesive portion.

6. The electronic apparatus according to claim 1, wherein, during the first posture, the display is formed with reverse bent portions configured to be bent in a direction opposite to the bent portion at each of positions overlapping the first non-adhesive portion and the second non-adhesive portion.

7. An electronic apparatus, comprising:

a first chassis;

a second chassis configured to be adjacent to the first chassis and connected to the first chassis to be relatively rotatable between a first posture in which the first chassis and the second chassis are stacked such that surface normal directions of the first chassis and the second chassis overlap each other, and a second posture in which the surface normal directions of the first chassis and the second chassis are disposed side by side each other on left and right sides; and a display assembly configured to be provided over between the first chassis and the second chassis, and be bent according to relative rotations of the first chassis and the second chassis, wherein the display assembly includes a first plate configured to have a first end portion and be fixed to the first chassis, a second plate configured to have a second end portion that is provided to face the first end portion with a predetermined gap and be fixed to the second chassis such that the first plate and the second plate are stacked such that surface normal directions of the first plate and the second plate overlap each other during the first posture and the first plate and the second plate are disposed with the surface normal directions of the first plate and the second plate being aligned side by side each other on left and right sides during the second posture, and a flexible display configured to have a first region fixed to a surface of the first plate, a second region fixed to a surface of the second plate, and a bending region disposed to straddle the gap between the first region and the second region, the bending region of the display is formed with an arc-shaped bent portion at a position protruding from the first end portion and the second end portion during the first posture, and the bent portion has an outer diameter that is larger than a stacked height of the first plate and the second plate in a stacking direction of the first plate and the second plate, a gap is provided between the display and the surface of the first plate in a predetermined range from the first end portion, and a gap is provided between the display and the surface of the second plate in a predetermined range from the second end portion.

8. An electronic apparatus, comprising:

a first chassis;

a second chassis configured to be adjacent to the first chassis and connected to the first chassis to be relatively rotatable between a first posture in which the first chassis and the second chassis are stacked such that surface normal directions of the first chassis and the second chassis overlap each other, and a second posture in which the surface normal directions of the first chassis and the second chassis are disposed side by side each other on left and right sides; and a display assembly configured to be provided over between the first chassis and the second chassis, and be bent according to relative rotations of the first chassis and the second chassis, wherein the display assembly includes a first plate configured to have a first end portion and be fixed to the first chassis, a second plate configured to have a second end portion that is provided to face the first end portion with a predetermined gap and be fixed to the second chassis such that the first plate and the second plate are stacked such that surface normal directions of the first plate and the second plate overlap each other during the first posture and the first plate and the second plate are disposed with the surface normal directions of the first plate and the second plate being aligned side by side each other on left and right sides during the second posture, and a flexible display configured to have a first region fixed to a surface of the first plate, a second region fixed to a surface of the second plate, and a bending region disposed to straddle the gap between the first region and the second region, the bending region of the display is formed with an arc-shaped bent portion at a position protruding from the first end portion and the second end portion during the first posture, and the bent portion has an outer diameter that is larger than a stacked height of the first plate and the second plate in a stacking direction of the first plate and the second plate, and during the first posture, the display is formed with reverse bent portions configured to be bent in a direction opposite to the bent portion at each of a position overlapping the surface of the first plate in a predetermined range from the first end portion and a position overlapping the surface of the second plate in a predetermined range from the second end portion.

9. A display assembly, comprising:

a first plate configured to have a first end portion;

a second plate configured to have a second end portion that is provided to face the first end portion with a predetermined gap and be disposed side by side with the first plate; and a flexible display configured to have a first region fixed to a surface of the first plate by using a first adhesive member, a second region fixed to a surface of the second plate by using a second adhesive member, and a bending region disposed to straddle the gap between the first region and the second region, wherein the first plate and the second plate are connected via the display such that the first plate and the second plate are relatively rotatable between a first posture in which the first plate and the second plate are stacked such that surface normal directions of the first plate and the second plate overlap each other and a second posture in which the surface normal directions of the first plate and the second plate are disposed side by side each other on left and right sides, the bending region of the display is formed with an arc-shaped bent portion at a position protruding from the first end portion and the second end portion during the first posture, and the bent portion has an outer diameter that is larger than a stacked height of the first plate and the second plate in a stacking direction of the first plate and the second plate, the first plate has a first non-adhesive portion in which the first region is not fixed without the first adhesive member being provided in a predetermined range from the first end portion on the surface of the first plate, and the second plate has a second non-adhesive portion in which the second region is not fixed without the second adhesive member being provided in a predetermined range from the second end portion on the surface of the second plate.

* * * * *